3,388,160
N,N-DIFLUORAMIDES AND METHOD
FOR PREPARING SAME
Jeremiah P. Freeman and Robert C. Petry, Huntsville, Ala., assignors to Rohm & Haas Company, Philadelphia, Pa., a corporation of Delaware
No Drawing. Filed Feb. 8, 1961, Ser. No. 87,968
10 Claims. (Cl. 260—558)

This invention concerns amides containing the $NF_2$ group and processes for the preparation thereof.

The compounds of the present invention are of the general formula $$RCONF_2$$

in which R is hydrogen, alkyl, aryl, or alkaryl.

The compounds of the present invention are of value as a source of difluoroamine, $HNF_2$. Thus, aqueous or alcoholic acid hydrolysis of the N,N-difluoramides of the present invention produces $HNF_2$. $HNF_2$, by addition to ketones, produces alcohols containing $NF_2$ groups which alcohols, when esterified with unsaturated acids, give polymerizable monomers. The polymers of such monomers are of value as solvent resistant coatings, as binders for caulking compounds and, when plasticized, are useful as components of pressure sensitive adhesives.

The compounds of the present invention are prepared by reacting diketones of the formula $$RCOCOR$$

in which R is as hereinbefore described with tetrafluorohydrazine, $N_2F_4$, while subjecting the reaction mixture to ultraviolet irradiation.

The diketones suitable for use in the present invention can be prepared by the catalytic dehydrogenation of acyloins obtained by the reaction of esters and sodium. Thus, $$2RCO_2C_2H_5 \xrightarrow{Na} RCHOHCOR \xrightarrow{-H_2} RCOCOR$$

The preparation of $N_2F_4$ is set forth by Colburn et al. in J.A.C.S. 80, 5004 (1958) and the information therein is incorporated herein by reference. $N_2F_4$ is prepared by the thermal reaction of nitrogen trifluoride with fluorine acceptors, such as copper, bismuth and arsenic.

The diketones suitable for use in the process of the present invention include glyoxal, 2,3-butanedione, 2,3-pentanedione, 3,4-heptanedione, 2,3-octanedione, 1-phenyl-2,3-butanedione, 1-benzyl-2,3-pentanedione, 5-p-tolyl-2,3-pentanedione, 6-naphthyl-3,4-hexanedione, 1,2-diphenylethylanedione (benzil) and methylphenyl diketone.

Any source of UV light can be employed to effect the reaction between $N_2F_4$ and diketones. Thus, the mixture of reactants in a Pyrex reactor can be exposed to sunlight. More satisfactory, however, is an artificial source of ultraviolet light and lamps having a high output of ultraviolet light are commercially available.

The temperature of reaction will vary depending on the particular diketone employed, since it is preferred to carry out the reaction in the gas phase. The reaction temperature will range from 25° C. to 200° C.

The reaction time will vary depending on the reactivity of the diketone and the intensity of the ultraviolet light. The reaction time will vary from 2 hours to 24 hours.

The molar ratios of diketone to $N_2F_4$ can be varied widely and still be within the scope of the invention. Theoretically, the reaction requires one mole of $N_2F_4$ for each mole of diketone but since any unused $N_2F_4$ can be readily recovered, the preferred embodiment employs an excess of $N_2F_4$ in order to obtain higher yields of the desired product. Thus, from 2 to up to 10 moles of $N_2F_4$ may be employed per mole of diketone, the excess being recovered and reused. Preferred is the use of 2 to 5 moles of $N_2F_4$ per mole of diketone.

It is preferred to carry out the reaction in an anhydrous inert, i.e. oxygen-free, atmosphere, and so the reaction vessel is flushed with an inert gas such as nitrogen, helium or argon before the reactants are charged to the vessel. The inert anhydrous atmosphere is maintained throughout the reaction.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

Two grams of biacetyl and 1030 cc. of $N_2F_4$ were irradiated in a Pyrex bulb with Hanovia EH–4 ultraviolet lamp for 16 hours. The product, N,N-difluoracetamide, condensed at −80° C., was removed, and distilled in vacuo, B.P. 45–47°/atm. press.

Analysis.—Calculated for $C_2H_3F_2NO$: C, 25.27; H, 3.18; N, 14.74; F, 39.98. Found: C, 26.36; H, 3.11; N, 14.40; F, 37.88.

EXAMPLE II

Preparation of N,N-difluorobenzamide

A 1 l. three-necked Pyrex flask equipped with magnetic stirrer, manometer, and inlets to $N_2$, $N_2F_4$ and a vacuum pump, was charged with 5 g. ($2.4 \times 10^{-2}$ mole) of benzil in 300 cc. of methyl cyclohexane. The system was flushed with $N_2$ for 5 minutes. More of the $N_2$ was evacuated with the vacuum pump, and $N_2F_4$ was admitted until atmospheric pressure was registered on the manometer. The contents of the flask were stirred magnetically at ambient temperature and irradiated with a Hanovia EH–4 lamp for 4 hours. Periodic additions of $N_2F_4$ were made to keep the system near atmospheric pressure. At the completion of the reaction the system was flushed thoroughly with nitrogen and the reaction mixture distilled with an efficient fractionating column. There was obtained 1.8 g. of N,N-difluorobenzamide, B.P. 36° C./1 mm.

Analysis.—Calculated for $C_7H_5ONF_2$: C, 53.51; H, 3.19; N, 8.91; F, 24.20. Found: C, 54.28; H, 3.67; N, 8.78; F, 21.54.

Treatment of a sample with $H_2O$ rapidly produced benzoic acid and $HNF_2$:

$$C_6H_5CONF_2 + H_2O \rightarrow C_6H_5COOH + HNF_2$$

EXAMPLE III

Preparation of N,N-difluoroformamide

A 1 l. Pyrex reaction bulb was charged in vacuo with 0.010 mole $N_2F_4$ and 0.0043 mole of monomeric glyoxal (prepared by the thermal depolymerization of polyglyoxal in the presence of $P_2O_5$). The reaction bulb was irradiated at ambient temperature with a Hanovia EH–4 lamp for 35 minutes after which time the yellow color of the monomeric glyoxal had disappeared and the reaction bulb was coated with white solid. The bulb was cooled in liquid nitrogen and the non-condensable fraction removed with a Toeppler pump, measured and analyzed by mass spectrometry. The fraction amounted to 0.0081 mole and was found to be pure CO. The remainder of the reaction mixture was fractionated thru traps at −80°, −120° and −196° C. The −196° fraction amounted to 0.0081 mole. Mass spectral analysis showed only $N_2F_4$ containing a trace of $N_2O$. The −120° fraction amounted to 0.00087 mole; mass and infrared spectra showed it to contain 13% $HNF_2$ with the remainder being N,N-difluoroformamide, $HCONF_2$. There was no −80° fraction. The solid residue in the reaction bulb was not characterized.

The infrared spectrum of HCONF$_2$ is characterized by the following absorption bands C—H, 3.40μ; C=O, 5.50μ; NF, 9.3, 10.6, and 12.4μ.

The mass spectrum of N,N-difluoroformamide is given below. The sample contained 3% HNF$_2$ as contaminant.

| M/e | R.I. | Ion |
|---|---|---|
| 26 | 1.2 | CN+ |
| 27 | 2.6 | HCN+ |
| 28 | 8.2 | CO+ |
| 29 | 100 | HCO+ |
| 33 | 5.4 | NF+ |
| 34 | 8.2 | HNF+ |
| 42 | 3.4 | CON+ |
| 43 | 4.7 | HCON+ |
| 47 | 1.2 | COF+ |
| 48 | 0.8 | HCOF+ |
| 52 | 2.5 | NF$_2$+ |
| 53 | 1.1 | HNF$_2$+ |

The following reactions were carried out as additional proof of structure.

$$HCONF_2 + H_2O \rightarrow HCOOH + HNF_2$$

$$HCONF_2 + CH_3OH \rightarrow HCOOCH_3 + HNF_2$$

Equimolar quantities of the two reagents (HCONF$_2$ and water or methanol) were condensed in vacuo at −196° C. After warming to room temperature, the reaction mixture was separated by low temperature vacuum fractionation. Formic acid and methylformate were identified by infrared spectra. Difluoramine was identified by mass and infrared spectra. Both reactions occurred quantitatively.

We claim:

1. A process for the preparation of N,N-difluoramides of the general formula

RCONF$_2$ in which R is as hereinafter defined which comprises irradiating with ultraviolet light a mixture of tetrafluorohydrazine, N$_2$F$_4$, and a diketone of the formula

RCOCOR in which R is a member of the group consisting of H, a C$_1$ to C$_5$ alkyl group, phenyl, benzyl, β-phenyl ethyl, β-p-tolyl ethyl, and β-naphthyl ethyl, and recovering the N,N-difluoramide from the reaction mixture.

2. A process as set forth in claim 1 in which the reaction temperature is from 25° C. to 200° C.

3. A process as set forth in claim 1 in which the molar ratio of diketone to N$_2$F$_4$ is from 1 to 2 to 1 to 10.

4. A process as set forth in claim 1 in which the molar ratio of diketone to N$_2$F$_4$ is from 1 to 2 to 1 to 5.

5. A process as set forth in claim 1 in which the reaction is conducted in an anhydrous atmosphere which is inert under the reaction conditions.

6. A process as set forth in claim 5 in which the inert atmosphere is selected from the group consisting of nitrogen, argon and helium.

7. A compound of the formula

RCONF$_2$ in which R is a group selected from the group consisting of hydrogen, a C$_1$ to C$_5$ alkyl group, phenyl, benzyl, β-phenyl ethyl, β-p-tolyl ethyl, and β-naphthyl ethyl.

8. N,N-difluoracetamide.

9. N,N-difluorobenzamide.

10. N,N-difluoroformamide.

References Cited

Emeleus et al.: Advances in Inorganic Chemistry, vol. 3 (1961), pp. 356–66.

NICHOLAS S. RIZZO, *Primary Examiner.*

J. NARCAVAGE, *Assistant Examiner.*